(12) United States Patent
Ellenberger

(10) Patent No.: US 7,686,542 B2
(45) Date of Patent: Mar. 30, 2010

(54) METHOD OF PROTECTING A SURFACE OF ROCK OR SOIL

(75) Inventor: Peter Ellenberger, Meilen (CH)

(73) Assignee: Construction Research & Technology GmbH, Trostberg (DE)

( * ) Notice: Subject to any disclaimer, the term of this patent is extended or adjusted under 35 U.S.C. 154(b) by 465 days.

(21) Appl. No.: 10/548,196

(22) PCT Filed: Feb. 26, 2004

(86) PCT No.: PCT/EP2004/001926

§ 371 (c)(1),
(2), (4) Date: May 4, 2006

(87) PCT Pub. No.: WO2004/079162

PCT Pub. Date: Sep. 16, 2004

(65) Prior Publication Data

US 2007/0025821 A1 Feb. 1, 2007

(30) Foreign Application Priority Data

Mar. 6, 2003 (GB) ................................. 0305078.8

(51) Int. Cl.
*E21D 11/00* (2006.01)

(52) U.S. Cl. .................... 405/132; 405/150.1; 405/138; 405/263

(58) Field of Classification Search ................. 405/263, 405/264, 302.4, 302.6, 132, 138, 146, 147, 405/150.1, 150.2
See application file for complete search history.

(56) References Cited

U.S. PATENT DOCUMENTS

| 2,865,177 | A | * | 12/1958 | Gnaedinger | 405/270 |
| 3,195,273 | A | * | 7/1965 | Scott et al. | 405/263 |
| 3,763,072 | A | * | 10/1973 | Krieger | 405/264 |
| 3,873,487 | A | * | 3/1975 | Minato et al. | 405/264 |
| 4,168,593 | A | * | 9/1979 | Jankowiak | 405/264 |
| 4,237,182 | A | | 12/1980 | Fulmer et al. | |
| 4,277,203 | A | * | 7/1981 | Reed et al. | 405/264 |
| 4,475,847 | A | | 10/1984 | Cornely et al. | |
| 4,607,066 | A | | 8/1986 | Barry et al. | |
| 4,669,919 | A | * | 6/1987 | Hilterhaus et al. | 405/264 |
| 4,690,589 | A | * | 9/1987 | Owa | 405/263 |
| 5,125,770 | A | * | 6/1992 | Hesseling et al. | 405/263 |
| 5,199,823 | A | | 4/1993 | Mueller et al. | |
| 5,436,396 | A | | 7/1995 | Bailey et al. | |
| 5,456,553 | A | * | 10/1995 | Ii et al. | 405/263 |
| 5,716,711 | A | | 2/1998 | Calder et al. | |
| 5,962,144 | A | | 10/1999 | Primeaux, II | |
| 6,270,291 | B2 | * | 8/2001 | Gamliel et al. | 405/263 |
| 6,966,610 | B2 | * | 11/2005 | Mills | 405/302.4 |
| 2001/0001634 | A1 | * | 5/2001 | Gamliel et al. | 405/263 |
| 2002/0151637 | A1 | | 10/2002 | Pretorious et al. | |
| 2003/0011235 | A1 | * | 1/2003 | Mills | 405/150.2 |
| 2003/0119955 | A1 | | 6/2003 | Dulzer et al. | |

FOREIGN PATENT DOCUMENTS

| GB | 982 661 A | 2/1965 |
| WO | WO 97/06211 | 2/1997 |
| WO | WO 00/69970 | 11/2000 |
| ZA | 82/03384 | 5/1982 |

OTHER PUBLICATIONS

XP-02278291; Abstract ZA 8203384; Feb. 16, 1983; Protective Coating of Underground Surfaces by Applying Latex Composition and Coagulant; Jayco Sealants Pty.
Derwent WPAT On-Line Abstract No. 89-348262/47 ZA 8809444 A (Certified Techn COR) Aug. 30, 1989 Abstract.

* cited by examiner

*Primary Examiner*—Frederick L Lagman
(74) *Attorney, Agent, or Firm*—Curatolo Sidoti Co., LPA; Joseph G. Curatolo; Salvatore A. Sidoti

(57) ABSTRACT

The surface of rock or soil, newly-exposed, for example, by tunnelling, and having the tendency to become friable on exposure to the atmosphere, can be protected by forming thereon a film by the process of combining on the surface at least one coagulable material and a coagulating agent therefor. The preferred coagulable material is an aqueous polymer dispersion, preferably one which has some degree of elastomeric properties, and preferably one which additionally is anionically stabilized.

17 Claims, No Drawings

METHOD OF PROTECTING A SURFACE OF ROCK OR SOIL

CROSS REFERENCE TO RELATED APPLICATIONS

This application is a national stage application of International Application No. PCT/EP2004/001926, filed Feb. 26, 2004, which claims the benefit of Application No. GB 0305078.8, filed Mar. 6, 2003, from which applications priority is claimed.

This invention relates to a method of rock protection.

Certain types of otherwise firm rock can change their characteristics markedly when exposed to the atmosphere. For example, chalk marl is firm and hard in the mass, but if a tunnel is driven through such rock and the subsequent tunnel is exposed to the atmosphere, the rock can dry out and/or be attacked by atmospheric oxygen, such that it becomes friable, to the point of crumbling. This is accentuated by forced ventilation, which is sometimes essential. There is therefore the danger that a tunnel driven through such rock can suffer substantial damage before a permanent cladding can be applied and involve considerable time and effort (and cost) in rectifying the damage. Moreover, such conditions can make such a cladding necessary, and this adds expense to the tunnelling operation.

It has now been found that the faces of such tunnels can be given highly effective temporary protection by applying particular materials thereto. The invention therefore provides a method of protecting a newly-exposed surface of rock or soil which has the tendency to become friable on exposure to the atmosphere, by forming thereon a film by the process of combining on the surface at least one coagulable material and a coagulating agent therefor.

By "coagulable" material is meant any material which can be prepared in a fluid form and which then may be coagulated to form a coherent film. Such a material may be organic or inorganic. An inorganic example is "water glass", a type of sodium silicate. There are many possible organic types, for example, bitumen emulsions.

However, the best materials for the purposes of this invention are aqueous polymer dispersions, commonly referred to as "emulsions", "latices" or "latexes". Such materials are very well known to the art and substantial numbers are commercially available. They generally consist of aqueous dispersions of particles of polymer that form coherent films by coalescence, and they are often encountered as components of so-called "emulsion" or "latex" paints. Not all such polymers are suitable for the purposes of this invention, and a useful test is to see whether they are suitable for forming so-called "dipped goods". These are goods which are coated by first immersing them in a coagulant and then in an aqueous coating dispersion. Any polymer dispersion that will give a coherent film in such an application is suitable for use in this invention.

The polymer of such dispersions is usually (but not always) thermoplastic. For the purposes of this invention, it is preferred that the polymer have some degree of elastomeric properties. This may be realised by using monomers which are known to confer such properties, for example, a sufficient proportion of at least one monomer which has a glass transition temperature which is sufficiently low that the polymer has a glass transition temperature which is lower than the ambient temperature at which the polymer will be used. A typical example is a "rubbery" monomer such as butadiene.

The particles are typically of size 0.2-10 micrometres. The dispersions are always stabilised, and this can be done anionically, cationically or nonionically. All can be caused to coagulate and all can be used in the working of this invention. However, coagulation is more easily caused when the dispersion is ionic, and such dispersions are preferred, anionic dispersions particularly so.

It is particularly preferred that the polymers involved be of an elastomeric or rubbery nature. This means that the polymers should have glass transition temperatures which are lower than the ambient temperature of the tunnel environment. Particularly preferred polymers are those that comprise substantial proportions of monomer units derived from "rubbery" monomers such as butadiene, isoprene and chloroprene.

Typical examples of suitable aqueous polymer dispersions for use in this invention include polychloroprene latex and styrene-butadiene copolymer latex.

The coagulating agent may be any material capable of coagulating an aqueous dispersion, and the skilled person will readily recognise the types of material useful for such purpose and select a suitable material. Thus, in the case of anionically-stabilised dispersions, polycationic species may be used. Most commonly (and cheaply), these can be metal cations, which are at least divalent, for example, calcium, magnesium and iron. Typical materials useful as coagulating agent are the water-soluble salts of such cations, for example, calcium nitrate, calcium chloride, magnesium sulphate, aluminium sulphate and iron sulphate.

In the case of cationically-stabilised dispersions, the water-soluble salts of polyanionic species may be used as coagulating agents. Examples of suitable polyanionic species include phosphates, sulphates and borates and typical examples of such compounds include aluminium sulphate, sodium and potassium phosphates and borates.

In a variation on these methods, it is possible to use a cationic dispersion as a coagulating agent for an anionic dispersion and vice versa.

As coagulation takes place immediately on contact between coagulable material and coagulating agent, it means that the two must be combined only at the surface to which they are applied. This can easily be done by applying both simultaneously by spraying on to the surface. This can be done by any convenient method, for example, by two spray guns, or more conveniently by means of a single spray gun with twin nozzles. Appropriate metering is well within the skill of the art and may readily be adapted to any situation.

When the coagulable material and the coagulating agent are applied to a newly-exposed substrate of rock or soil which is liable to crumbling on drying out (for example, if exposed to forced ventilation), a film immediately begins to form and water is expelled. The material can be sprayed as thickly as necessary to cover particular fissures or holes, and it effectively prevents evaporation of water or oxidation, thus preventing the substrate from crumbling.

The invention is further described with reference to the following example.

The aqueous dispersion used is "Synthomer" 28 W20 ("Synthomer" is a registered trade mark), a commercially-available, anionically-stabilised styrene-butadiene latex of 60% solids by weight. and the coagulating agent is a 6% (by weight) aqueous solution of calcium nitrate. The dispersion is fed by means of a pump (an "Everspray" (trade mark) type 2000 is used) to one nozzle of a Binks Model 43 PL twin nozzle spray gun. A nozzle type A63/443 is used. The coagulating agent is fed by means of an "Everspray" Type 1000 pump to the other nozzle of the twin spray gun, a nozzle type 90/421 being used. The nozzles are adjusted such that the spray patterns converge about 15-20 cm from the nozzles and the surface to be sprayed is 30-40 cm from the nozzles. The respective feed rates for the dispersion and coagulating agent are 2 Kg./min and 0.3 Kg./min.

The two ingredients are sprayed on to a surface of chalk marl which has been newly exposed behind a tunnel boring machine and the use of which tunnel will require forced ventilation. A continuous, coherent, tough, rubbery film is formed. The need for thicker layers in places of particular need is accommodated by simply spraying more at that point. When forced ventilation is applied, there is no drying out or oxidation of the rock and the sprayed faces remain firm and unaffected.

The invention claimed is:

1. A method of forming a tunnel, comprising creating a newly-exposed surface of rock or soil; and, protecting the newly-exposed surface of rock or soil which becomes friable on exposure to the atmosphere, by forming thereon a film by the process of combining on the surface at least one coagulable material comprising an aqueous polymer dispersion that is cationically stabilised, formed from a monomer that is at least one of butadiene, isoprene, or mixtures thereof and a coagulating agent therefor wherein polyanionic materials are used as coagulating agents for said cationically stabilised polymer dispersions.

2. The method according to claim 1, wherein the polymer has elastomeric properties.

3. The method according to claim 1, wherein an anionically-stabilised dispersion is used as a coagulating agent for a cationically stabilised dispersion.

4. The method according to claim 1 wherein the polymer is thermoplastic.

5. The method according to claim 2 wherein the polymer is formed from a sufficient proportion of monomer which has a glass transition temperature which is lower than the ambient temperature at which the polymer will be used.

6. The method according to claim 1 wherein the polymer is at least one of styrene-butadiene copolymer latex or mixtures thereof.

7. The method according to claim 1 wherein the polyanionic material used comprises at least one of phosphates, sulphates, borates or mixtures thereof.

8. The method according to claim 7 wherein the polyanionic material used comprises at least one of aluminum sulphate, sodium phosphate, potassium phosphate or mixtures thereof.

9. The method according to claim 1 wherein the coagulable material and coagulating agent are applied to the surface of rock or soil simultaneously or within a short period of time of each other.

10. The method according to claim 1 wherein the coagulable material and coagulating agent are applied to the surface of rock or soil using two spray guns or a single spray gun with two nozzles.

11. A method of forming a tunnel having a protected surface layer comprising: boring a tunnel to newly expose a surface of rock or soil which becomes friable on exposure to the atmosphere; and forming thereon a film by the process of combining on the surface at least one coagulable material and a coagulating agent therefor; wherein the coagulable material comprises an aqueous polymer dispersion; and, wherein a cationically-stabilised dispersion is used as a coagulating agent for an anionically-stabilised dispersion or an anionically-stabilised dispersion is used as a coagulating agent for a cationically-stabilised dispersion.

12. The method according to claim 11 wherein the polymer is formed from a monomer comprising at least one of butadiene, isoprene or mixtures thereof.

13. The method according to claim 11 wherein the dispersion is anionically or cationically stabilised.

14. The method according to claim 11 wherein water soluble salts of polycationic materials are used as coagulating agents for anionically stabilised dispersions.

15. The method according to claim 14 wherein polycationic coagulating agents comprise metal cations.

16. The method according to claim 15 wherein the metal cation used comprises at least one of calcium, magnesium, aluminum, iron or mixtures thereof.

17. The method according to claim 15 wherein the polycationic material used comprises a water soluble salt of at least one of calcium nitrate, calcium chloride, magnesium sulphate, aluminum sulphate or mixtures thereof.

* * * * *